United States Patent
Andre et al.

(10) Patent No.: US 10,589,794 B2
(45) Date of Patent: Mar. 17, 2020

(54) SUPPORTING STRUCTURE FOR A FRONT-END MODULE OF A MOTOR VEHICLE AND FRONT-END MODULE COMPRISING SAID SUPPORTING STRUCTURE

(71) Applicant: Valeo Systemes Thermiques, Le Mesnil Saint Denis (FR)

(72) Inventors: Stephan Andre, Le Mesnil Saint Denis (FR); Jean-Paul Herlem, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 132 days.

(21) Appl. No.: 15/760,058

(22) PCT Filed: Aug. 24, 2016

(86) PCT No.: PCT/EP2016/069926
§ 371 (c)(1),
(2) Date: Jul. 5, 2018

(87) PCT Pub. No.: WO2017/045878
PCT Pub. Date: Mar. 23, 2017

(65) Prior Publication Data
US 2018/0304934 A1    Oct. 25, 2018

(30) Foreign Application Priority Data

Sep. 14, 2015 (FR) .................. 15 58570

(51) Int. Cl.
*B62D 25/08* (2006.01)
*B62D 29/04* (2006.01)

(52) U.S. Cl.
CPC ......... *B62D 25/084* (2013.01); *B62D 25/085* (2013.01); *B62D 29/043* (2013.01)

(58) Field of Classification Search
CPC .................. B62D 25/084; B62D 25/085
(Continued)

(56) References Cited

U.S. PATENT DOCUMENTS

| 4,428,447 A * | 1/1984 | Malen ............... B62D 25/084 165/53 |
| 6,293,615 B1 * | 9/2001 | Tarahomi ............ B62D 25/084 180/68.4 |

(Continued)

FOREIGN PATENT DOCUMENTS

DE   10 2006 046817 A1   4/2008
EP      2 394 886 A2    12/2011

OTHER PUBLICATIONS

International Search Report issued in PCT/EP2016/069926 dated Nov. 18, 2016 (3 pages).

(Continued)

*Primary Examiner* — Joseph D. Pape
(74) *Attorney, Agent, or Firm* — Osha Liang LLP

(57) ABSTRACT

The invention relates to a supporting structure (10) for a front-end module of a motor vehicle, said supporting structure comprising a lower crossmember (13), a first side post (11), a second side post (12) and an upper crossmember (14). According to the invention, the supporting structure (10) comprises a first (40, 140, 240) and a second (50, 150, 250) supporting arm received within the supporting structure (10), the first supporting arm (40, 140, 240) being connected via the first end (41, 141, 241) thereof to the first side post (11) and via the second end (42, 142, 242) thereof to the upper crossmember (14), and/or the second supporting arm (50, 150, 250) being connected via the first end (51, 151, 251) thereof to the second side post (12) and via the second (Continued)

Figure 1:
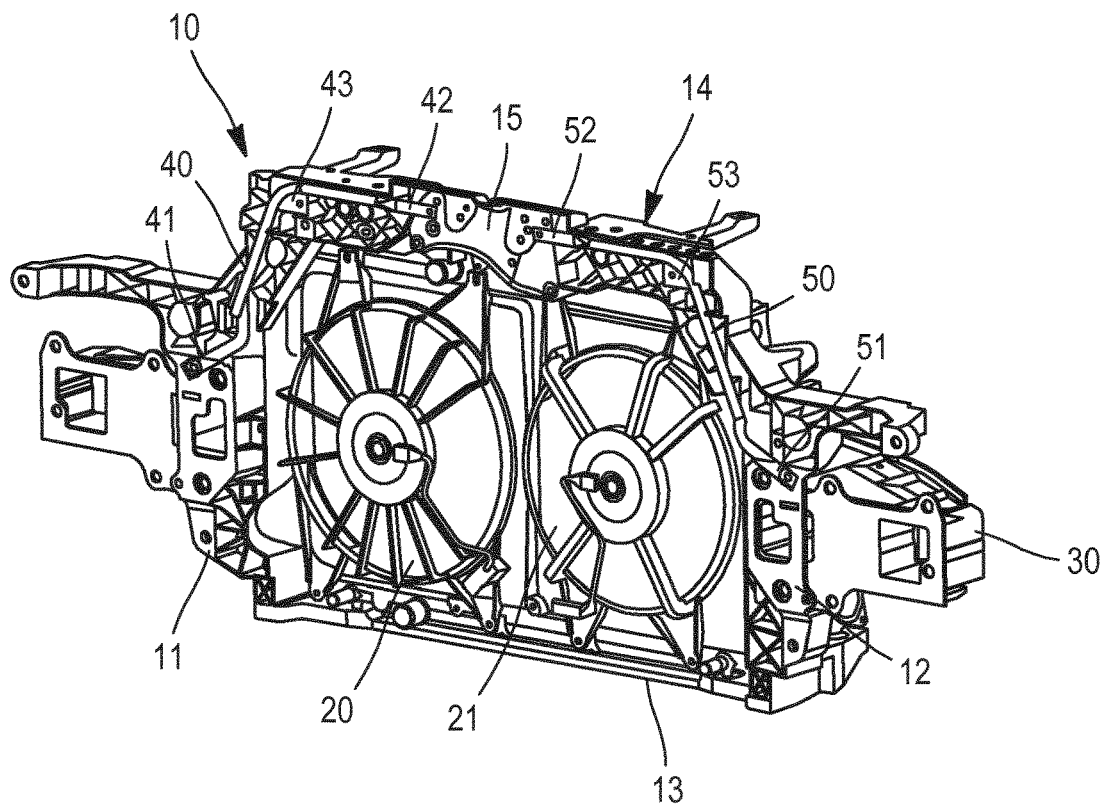

end (52, 152, 252) thereof to the upper crossmember (14). The invention also relates to a front-end module comprising such a supporting structure.

13 Claims, 4 Drawing Sheets

(58) Field of Classification Search
USPC .................................... 296/193.09, 187.09
See application file for complete search history.

(56) References Cited

U.S. PATENT DOCUMENTS

| | | |
|---|---|---|
| 2011/0011661 A1 | 1/2011 | Takahashi et al. |
| 2014/0062140 A1 | 3/2014 | Townson et al. |
| 2014/0354013 A1* | 12/2014 | Hamner ............... B62D 25/085 |
| | | 296/193.09 |

OTHER PUBLICATIONS

Written Opinion of the International Searching Authority issued in PCT/EP2016/069926 dated Nov. 18, 2016 (8 pages).

* cited by examiner

SUPPORTING STRUCTURE FOR A FRONT-END MODULE OF A MOTOR VEHICLE AND FRONT-END MODULE COMPRISING SAID SUPPORTING STRUCTURE

DOMAIN OF THE INVENTION

The present invention relates to a front-end module for a motor vehicle, and more specifically to a supporting structure designed for said front-end module.

PRIOR ART

In general, in a motor vehicle, a front-end module is a structural element designed to contain a plurality of devices required to operate the motor vehicle, such as headlamps or heat exchangers. On completion of production of a front-end module, the front-end module can be assembled directly onto the motor vehicle, notably with elements of the chassis of the motor vehicle, such as side members.

The front-end module can also be mounted on the motor vehicle by assembly with a fender or front shield. In a known manner, the front-end module has a supporting structure that is designed to hold the devices required to operate the motor vehicle and a fender to protect said devices in the event of a frontal collision of said motor vehicle.

The supporting structure of the front-end module comprises different parts that are connected together. Thus, the supporting structure comprises a lower cross member, side pillars for said lower cross member, an upper cross member that is designed to be connected to the top of the side pillars and strengthening arms connected to the ends of the upper cross member and/or on the side pillars. In general, such a supporting structure is made entirely of a strong material such as an adapted plastic, to ensure compliance with the motor vehicle safety regulations in the event of a frontal collision between a pedestrian and a motor vehicle.

In a known manner, the supporting structure also includes a hood lock (also referred to as an engine hood lock) to lock the hood of the engine compartment of the motor vehicle in the closed position. However, during a frontal collision or attempted forced entry, the lock of the engine hood ceases to provide sufficient protection. Consequently, the prior art provides solutions designed to strengthen the lock of the engine hood.

A first solution involves reinforcing the supporting structure by adding straight reinforcements between the locking zone of the engine hood, located on the upper cross member, and each side pillar. The reinforcements are located towards the front of the supporting structure, i.e. towards the outside of the motor vehicle.

Another solution involves strengthening the supporting structure by adding a reinforcement plate to connect the locking zone of the engine hood of the upper cross member to the fender. The reinforcement plate is located on the front side of the supporting structure.

The solutions described above lack efficiency since, in the event of a frontal collision, the devices located inside the front-end module are nonetheless affected by the impact and damage the reinforcements, whether said reinforcements are straight reinforcements or reinforcement plates. Consequently, the strength of the lock of the engine hood is not guaranteed, which may result in the untimely opening of the hood in the event of said frontal impact.

In light of the forgoing, the design of a supporting structure of a front-end module according to the prior art needs to be improved in order to optimize operation of the motor vehicle, in accordance with the standards relating to motor vehicle safety regulations.

DESCRIPTION OF THE INVENTION

The supporting structure of the front-end module and the front-end module including said supporting structure according to the present invention are intended to overcome the drawbacks mentioned above.

Thus, the invention relates to a supporting structure for a front-end module of a motor vehicle, said supporting structure comprising a lower cross member, a first side pillar, a second side pillar and an upper cross member, said supporting structure essentially being made of a plastic material, characterized in that the supporting structure comprises a first and a second supporting arm embedded within the volume of the material of the supporting structure, the first supporting arm being connected via the first end thereof to the first side pillar and via the second end thereof to the upper cross member, and/or the second supporting arm being connected via the first end thereof to the second side pillar and via the second end thereof to the upper cross member.

Advantageously, at least one portion of each of the first and/or second supporting arms is seated in a recess or a slot formed in the supporting structure.

Advantageously, the supporting structure includes ribs that are designed to increase the rigidity of said supporting structure, in which said recess or said slot is defined by the space between two ribs.

According to one embodiment of the invention, said first and second supporting arms are "fitted" into the network of ribs.

Advantageously, the upper cross member includes a reinforcement plate, in which the second end of the first supporting arm and/or the second end of the second supporting arm are connected to said reinforcement plate.

Advantageously, the first and/or second supporting arms have at least one elbow portion.

Advantageously, the first and/or second supporting arm are made at least partially of a metal material or a mixture of metal materials, preferably essentially comprising a metal material or a mixture of metal materials.

Advantageously, the first and/or second supporting arms are each connected to the rest of the supporting structure by means of a connection element that is positioned at the connection between the first side pillar and the upper cross member and between the second side pillar and the upper cross member respectively.

Advantageously, the supporting structure also includes a connection element arranged at the elbow portion.

Advantageously, the connection element includes a removable cover.

Advantageously, the connection element includes a riveted fastener.

Advantageously, the supporting structure has a front face and a rear face that is opposite said front face, said rear face being designed to be positioned towards the passenger compartment of the motor vehicle, and in which the first and second supporting arms are positioned at said rear face.

Advantageously, the first and second supporting arms are connected to one another.

The invention also concerns a front-end module for a motor vehicle that has a supporting structure with the characteristics mentioned above.

SHORT DESCRIPTION OF THE DRAWINGS

Figure 2:
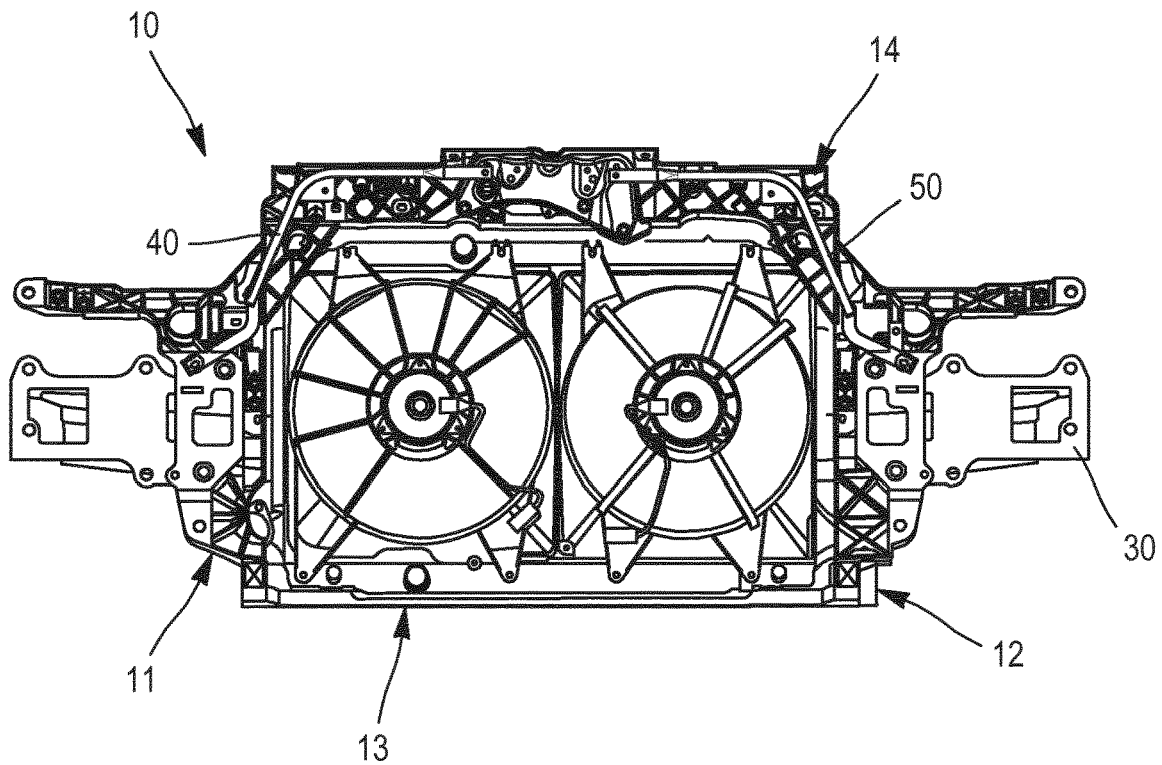
Figure 3:
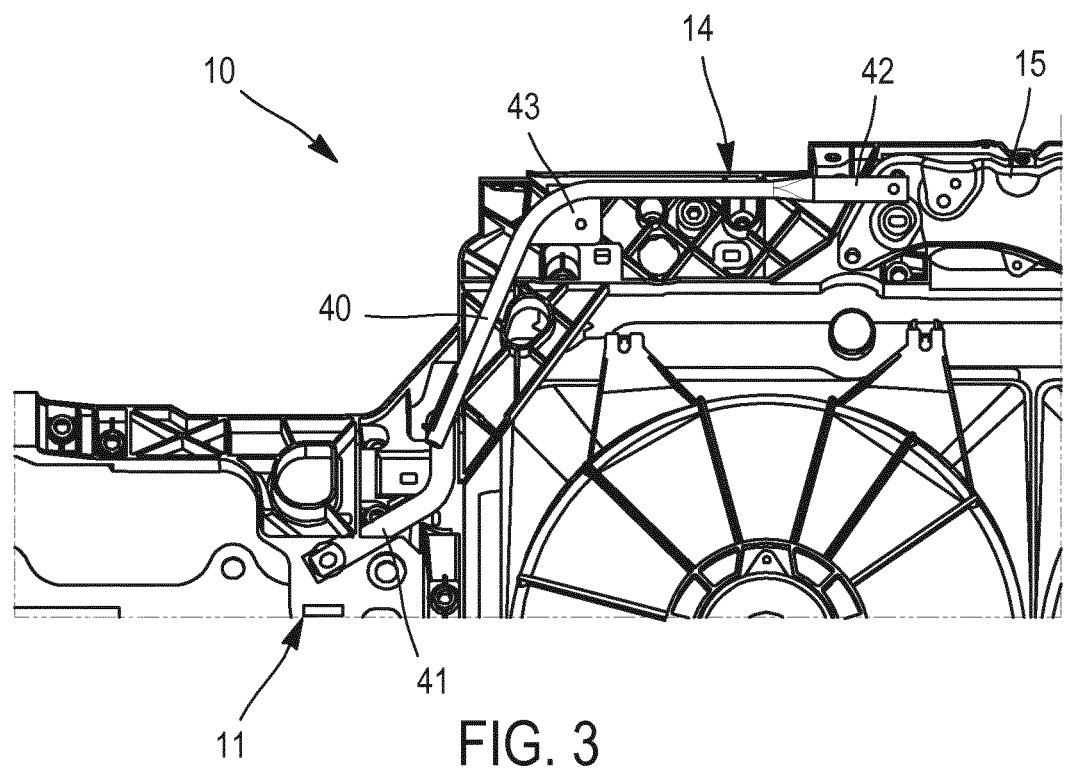
Figure 4:
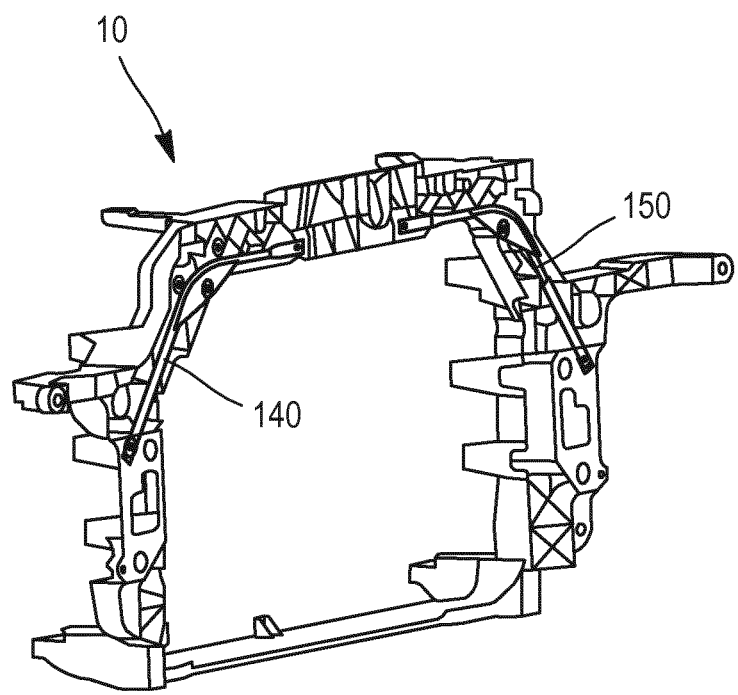
Figure 5:
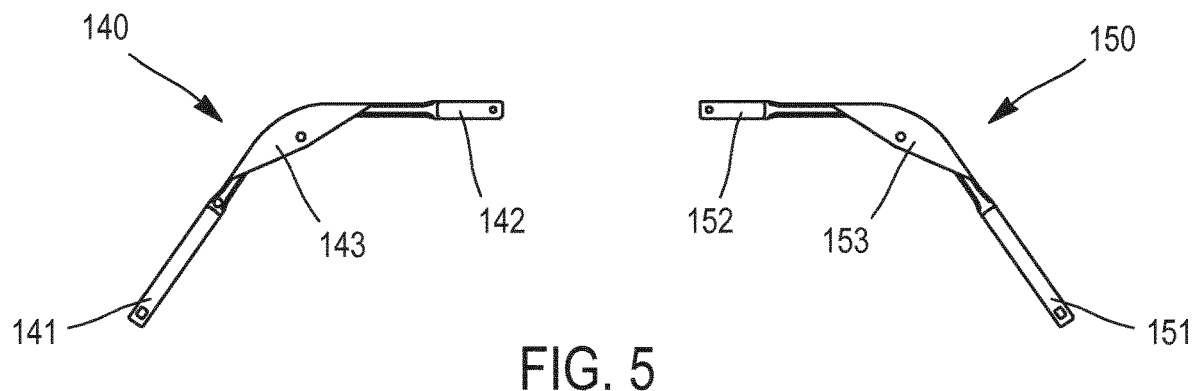
Figure 6:
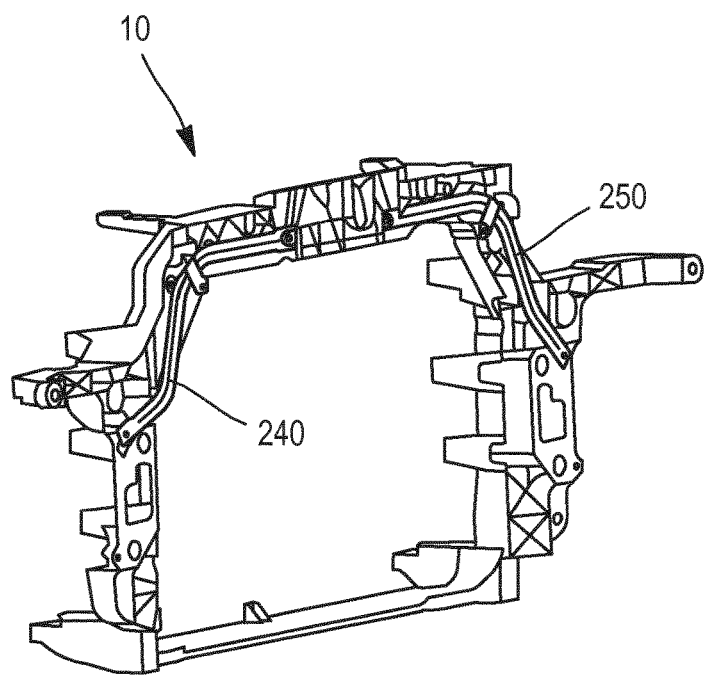
Figure 7:
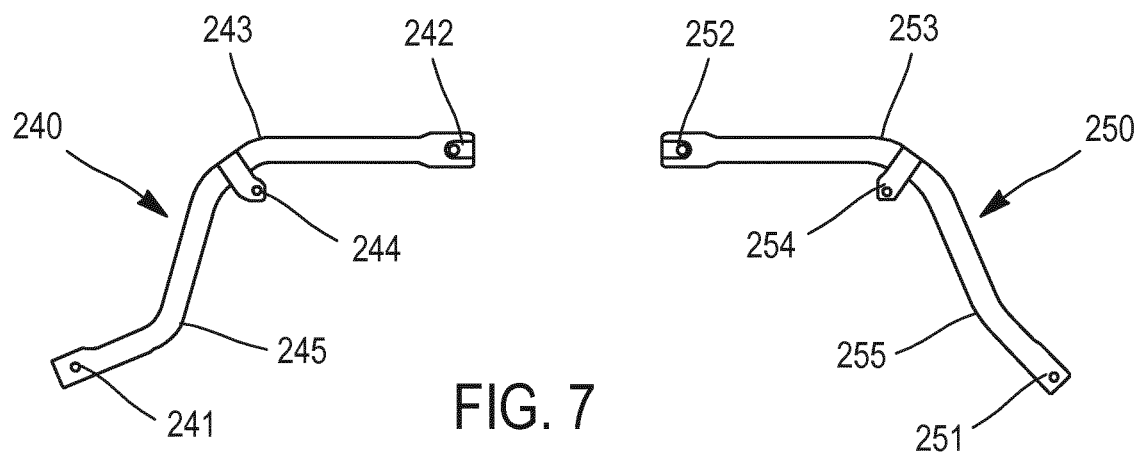
Figure 8:
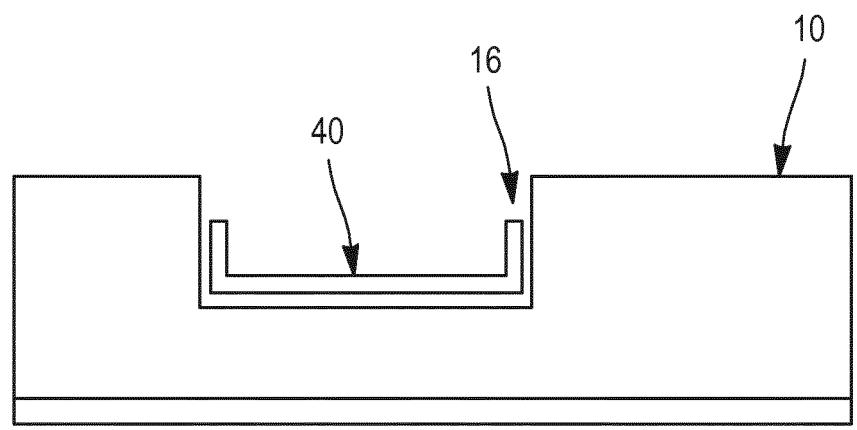

The objectives, purpose and characteristics of the present invention, as well as the advantages thereof, are set out more clearly in the following description, provided with reference to the drawings, in which:

FIG. 1 is a perspective view of the rear face of a supporting structure according to a first embodiment of the invention, FIG. 2 is a front view of the supporting structure shown in FIG. 1, FIG. 3 shows a detail of the supporting structure in FIG. 2, FIG. 4 is a perspective view of the supporting structure according to a second embodiment of the invention, this supporting structure including metal supporting arms having a different structure, FIG. 5 is a front view of the supporting structure shown in FIG. 4, FIG. 6 is a perspective view of the supporting structure according to a third embodiment of the invention, including metal supporting arms having a different structure, FIG. 7 is a front view of the supporting structure shown in FIG. 6, FIG. 8 shows schematically the engagement of a metal supporting arm inside the supporting structure.

DETAILED DESCRIPTION OF THE EMBODIMENTS

As specified above, FIG. 1 is a perspective view of the rear face of a supporting structure 10 according to one embodiment of the invention. The supporting structure 10 includes a first pillar 11, a second pillar 12, a lower cross member 13 and an upper cross member 14. The pillars 11, 12 and the cross members 13, 14 together essentially form a supporting structure in the form of a frame. This supporting structure is designed to contain several elements such as a radiator (not shown), a condenser (not shown) and fans 20, 21. The front face of the supporting structure (not shown) is designed to be connected to a beam 30.

Several other elements, such as lights, can be connected to the front face of the supporting structure. The different elements connected to the supporting structure 10 and said supporting structure together form a front-end module. Use of the English-language term "front-end module" (FEM) is known throughout the automotive industry. The front-end module is positioned behind the front fender and beneath the hood of the motor vehicle. In general, the upper cross member 14 includes elements designed to connect a hood lock to this upper cross member.

The supporting structure 10 shown in FIG. 1 is made of a plastic material selected to provide the supporting structure 10 with sufficient strength, such as to ensure compliance with standards set by motor vehicle safety regulations in the event of a frontal collision or attempted forced entry, since the lock of the engine hood does not always provide sufficient protection.

For this same purpose, the supporting structure 10 includes reinforcements designed to prevent the upper cross member from deforming, thereby strengthening the lock of the engine hood. A first reinforcement is positioned at the upper cross member 14, which is provided with a reinforcement plate 15 to improve the rigidity of this upper cross member 14.

Furthermore, and also with a view to reinforcing the supporting structure 10 according to the invention, the supporting structure 10 includes a first supporting arm 40 and a second supporting arm 50. The first supporting arm 40 has a first end 41 that is connected to the first pillar 11 of the supporting structure 10. The second end 42 of the first supporting arm 40 is connected to the reinforcement plate 15 on the upper cross member 14. Similarly, the second supporting arm 50 has a first end 51 that is connected to the second pillar 12, and a second end 52 that is connected to the reinforcement plate 15.

This link can be made by several possible connection means, such as screws and screw threads, nuts and bolts, riveted fastenings, removable covers or even welding.

As shown in FIG. 1, the supporting arms 40 and 50 each have a first straight portion and a second straight portion that are connected together by an elbow portion. The elbow portion of the first supporting arm 40 is connected to the rest of the supporting structure 10 by means of a connection element 43 that is positioned at the connection between the first pillar 11 and the upper cross member 14. Similarly, the elbow portion of the second supporting arm 50 is connected to the rest of the supporting structure 10 by means of a connection element 53 that is positioned at the connection between the second pillar 12 and the upper cross member 14.

FIG. 2 is a front view of the supporting structure 10 shown in FIG. 1. The pillars 11, 12 and the cross members 13, 14 comprise a plastic material or essentially consist of a plastic material or consist of a plastic material that is selected to provide the supporting structure 10 with sufficient strength, in order to ensure compliance with the standard set by motor vehicle safety regulations in the event of a frontal collision or attempted criminal offense, as indicated above. The supporting structure 10 includes ribs. These latter help to increase the rigidity of the supporting structure 10 while keeping volume and weight relatively low. According to the invention, the first arm 40 and the second arm 50 are connected to the supporting structure 10 by being embedded in the volume of plastic material of the supporting structure 10. Furthermore, the first and second arms 40, 50 are fitted into the network of ribs of the supporting structure 10, thereby preventing the deployment of the supporting arms 40, 50 in the event of impact.

A first advantage of the technical solution shown in FIGS. 1 and 2 is inherent in the fact that the supporting arms 40, 50 are connected to the rest of the supporting structure 10 without requiring an overmolding process. Thus, the supporting structure 10 can be obtained without the need to intervene on the production tool or tools for the supporting structure, such as the supporting structure 10 according to the invention. The fact that the supporting arms 40, 50 are connected to the outside of the plastic material forming the supporting structure enables the connection between the supporting structure 10 and the supporting arms 40, 50 to be calibrated and adjusted (advantageously both) relatively easily. Furthermore, if required, the supporting arms 40, 50 can be separated from the plastic material forming (or essentially forming) the pillars 11, 12 and the cross members 13, 14. This represents a consequent advantage when repairing and/or recycling the supporting structure 10.

FIG. 3 is a magnified view of a portion of the supporting structure 10 shown in FIGS. 1 and 2. In FIG. 3, only the first supporting arm 40 is shown with the three connection points thereof to connect the supporting arm 40 to the supporting structure 10, the first end 41 of the supporting arm 40 being connected to the first pillar 11, the elbow portion being connected using a connection element 43 and the second end 42 of the supporting arm 40 being connected to the reinforcement plate 15. The different ribs fitted around the supporting arm 40 are clearly visible in FIG. 3. By way of example, the connection element 43, 53 has a removable cover or a riveted fastener.

FIGS. 4 and 5 show a supporting structure 10 according to a second embodiment of the invention, i.e. one having differently structured supporting arms 140 and 150. Indeed, as shown in FIG. 5, the supporting arm 140 has a first end 141 and a second end 142 that are connected together by means of an intermediate element that is a flat metal element 143 that is folded to obtain an elbow portion. Similarly, the supporting arm 150 has a first end 151 and a second end 152 that are connected together by means of a flat metal element 153.

FIGS. 6 and 7 show a supporting structure 10 according to a third embodiment. As shown in FIG. 7, the supporting arm 240 has a first end 241 that extends essentially in a first direction when said supporting arm 240 is connected to the rest of said supporting structure 10. The second end 242 is positioned essentially horizontally, in all cases when said supporting arm 240 is connected to the rest of said supporting structure 10. Between the first end 241 and the second end 242, there is an elbow portion 243 including a connection element 244 for connecting the elbow portion 243 to the supporting structure 10. Furthermore, the supporting arm 240 includes a second elbow portion 245 that is folded such that the aforementioned first direction, in which the first end 241 essentially extends when said supporting arm 240 is connected to the rest of said supporting structure 10, is not parallel to the direction in which the second arm 242 extends, i.e. same is not positioned essentially horizontally when said supporting arm 240 is connected to the rest of said supporting structure 10. In other words, the angle forming the elbow of the first elbow portion 243 is different from the angle forming the elbow of the second elbow portion 245. More specifically, according to the embodiment shown in FIG. 7, the angle forming the elbow of the first elbow portion 243 is more acute than the angle forming the elbow of the second elbow portion 245. According to an embodiment that is not illustrated, the second elbow portion 245 also includes a connection element.

As shown in FIG. 7, the second supporting arm 250 is structurally identical to the first supporting arm 240. For the sake of concision, the description provided above of the different portions of the first supporting arm 240 thus applies mutatis mutandis to the corresponding portions of the second supporting arm 250, which are logically numbered 251-255.

FIG. 8 schematically shows the blocking principle of a supporting arm 40 (as shown in FIGS. 1 to 3) in the network of ribs of the supporting structure 10. There is a slot 15 in the material forming the supporting structure 10, said slot being defined by the space between two ribs (not numbered). This slot 15 is designed to contain the supporting arm 40. Said supporting arm 40, including an elbow portion, cannot unfold without butting against the walls of each of the two aforementioned ribs in the material forming the supporting structure 10, said ribs consequently acting as stops. As such, the usually metal material making up the supporting arm 40 is blocked inside the slot 15 and cannot come out of this slot 15, thereby enabling the shape of the supporting arm 40 to be maintained, even if a certain force is exerted on the supporting arm 40.

According to one embodiment (not shown), the first supporting arms 40, 140, 240 and the second supporting arms 50, 150, 250 can be connected together.

The invention claimed is:

1. A supporting structure for a front-end module of a motor vehicle, said supporting structure comprising:
   a lower cross member;
   a first side pillar;
   a second side pillar;
   an upper cross member;
   a first supporting arm; and
   a second supporting arm seated in the supporting structure, wherein:
   the first supporting arm is connected via the first end thereof to the first side pillar and via the second end thereof to the upper cross member, and/or the second supporting arm is connected via the first end thereof to the second side pillar and via the second end thereof to the upper cross member,
   the upper cross member includes a reinforcement plate to protect the upper cross member from deformation,
   at least one of the second end of the first supporting arm and the second end of the second supporting arm are connected to the reinforcement plate, and
   the reinforcement plate is disposed on a rear face of the supporting structure that is on a side of the supporting structure where fans are installed and such that the smallest dimension of the reinforcement plate is along a front view direction of the supporting structure.

2. The supporting structure as claimed in claim 1, wherein at least one portion of each of the first supporting arm and/or second supporting arm is seated in a recess or a slot formed in the supporting structure.

3. The supporting structure as claimed in claim 2, said supporting structure including ribs, wherein said recess or said slot is defined by the space between two ribs.

4. The supporting structure as claimed in claim 1, wherein the first supporting arm and/or the second supporting arm include at least one elbow portion.

5. The supporting structure as claimed in claim 1, wherein the first supporting arm and/or the second supporting arm are made at least in part of a metal material or a mixture of metal materials.

6. The supporting structure as claimed in claim 5, wherein the first supporting arm and/or the second supporting arm are each connected to the rest of the supporting structure by means of a connection element.

7. The supporting structure as claimed in claim 6, wherein the supporting structure also includes a connection element arranged at the elbow portion.

8. The supporting structure as claimed in claim 6, the connection element having a removable cover.

9. The supporting structure as claimed in claim 6, the connection element having a riveted fastener.

10. The supporting structure as claimed in claim 1, wherein the supporting structure has a front face that is opposite the rear face, and/or in which the first supporting arm and second supporting arm are positioned at said rear face.

11. The supporting structure as claimed in claim 1, wherein the first supporting arm and the second supporting arm are connected to one another.

12. A front-end module including a supporting structure as claimed in claim 1.

13. A supporting structure for a front-end module of a motor vehicle, said supporting structure comprising:
    a lower cross member;
    a first side pillar;
    a second side pillar;

an upper cross member;
a first supporting arm; and
a second supporting arm seated in the supporting structure, wherein
the first supporting arm is connected via the first end thereof to the first side pillar and via the second end thereof to the upper cross member, and/or the second supporting arm is connected via the first end thereof to the second side pillar and via the second end thereof to the upper cross member, and
the first and second supporting arms are disposed away from air paths of a fan system disposed on the supporting structure.

\* \* \* \* \*